United States Patent [19]

Osborne

[11] Patent Number: 4,691,520
[45] Date of Patent: Sep. 8, 1987

[54] HYDRAULIC BRAKE SYSTEM

[76] Inventor: Lyle E. Osborne, 1506 Stanmore Ct., South Bend, Ind. 46614

[21] Appl. No.: 515,600

[22] Filed: Jul. 21, 1983

[51] Int. Cl.[4] ............................................. F15B 15/18
[52] U.S. Cl. ...................................... 60/593; 60/591; 303/84 R
[58] Field of Search ............... 60/548, 593, 563, 574, 60/575, 591; 91/415, 399, 401; 303/84 R

[56] References Cited

U.S. PATENT DOCUMENTS

| | | | |
|---|---|---|---|
| 1,985,361 | 12/1934 | Anthony et al. | 91/401 |
| 2,261,444 | 11/1941 | Neubert | 91/401 |
| 2,345,165 | 3/1944 | White | 60/593 |
| 2,575,719 | 11/1951 | Leeds | 91/399 |
| 3,408,119 | 10/1968 | Berglund | 303/84 R |
| 3,654,834 | 4/1972 | Sifri et al. | 91/399 |
| 3,883,189 | 5/1975 | Braun | 303/84 R |

FOREIGN PATENT DOCUMENTS

WO83/00059  1/1983  PCT Int'l Appl. .................. 60/593

Primary Examiner—Abraham Hershkovitz

[57] ABSTRACT

A hydraulic vehicle brake system of the type having a high system return pressure is provided. In order to minimize the size and strength of brake return springs required, the invention provides a device to be interposed between the brake and the brake control valve. Preferred embodiments of the device include an inlet port communicating with a brake valve and an outlet port communicating fluid pressure to a vehicle brake. A control assembly is provided intermediate the inlet and outlet ports and includes mechanisms for amplifying the hydraulic pressure effect in the direction from the outlet port to the return pressure system so that the brake return pressure exerted by the brake return springs can be substantially less than the hydraulic system return pressure.

20 Claims, 9 Drawing Figures

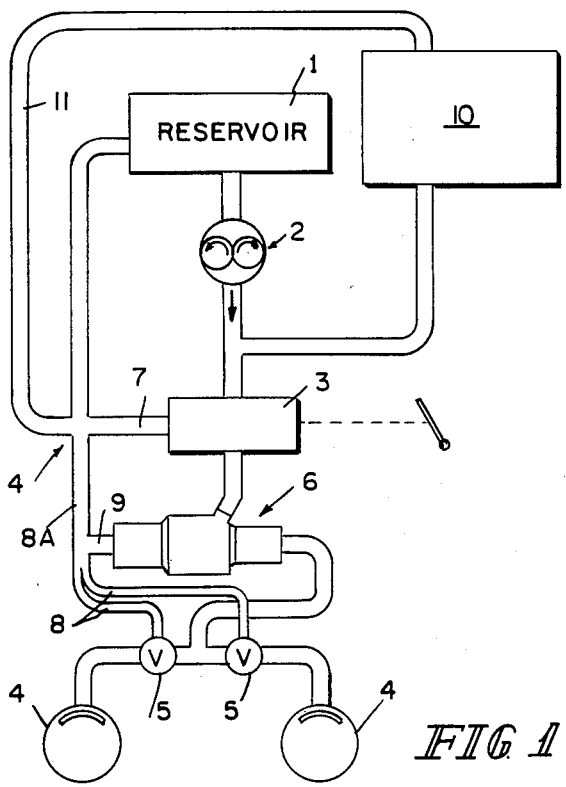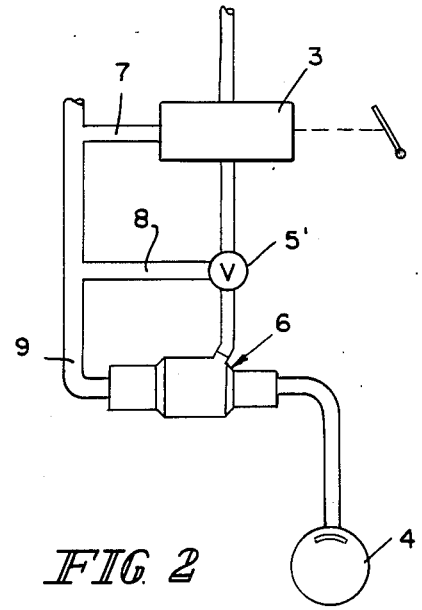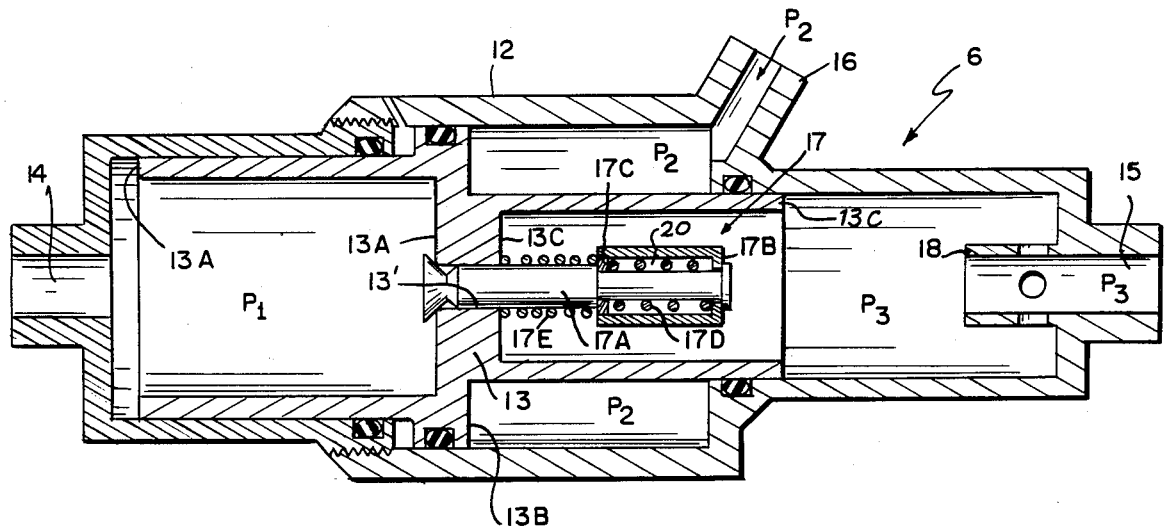
FIG. 1
FIG. 2
FIG. 3

HYDRAULIC BRAKE SYSTEM

BACKGOUND AND SUMMARY OF THE INVENTION

The present invention relates to hydraulic brake systems for vehicles, for example, for aircraft wheel brakes. Such hydraulic brake systems have return or low pressure lines as part of the hydraulic brake system circuit. In brake systems of this type there are sometimes conditions which create high pressures in the return lines due, for example, to operation of various hydraulic devices other than the brakes with the same hydraulic system. These other hydraulic devices have return lines in communication with the brake system return lines. The brakes in these systems must be designed so that they will release completely when hydraulic pressure is reduced by the brake control valve. However, with high brake return pressures in the low pressure return lines of the system, correspondingly high forces are needed to completely release the brakes by means of brake return springs. For example, if the system return pressure can be expected to be as high as 200 pounds per square inch (PSI) and the brake pistons have an area of 10 square inches, 2000 pounds of spring force would be necessary to release the brakes. Consequently such a braking system would require very heavy brake return springs with increased vehicle weight and cost of manufacture.

Brake systems currently in use include anti-skid systems with anti-skid valves for releasing brake fluid pressure when wheels being braked reach or approach skid conditions. Thus, any brake fluid control system for such brake systems should take into account the need for such anti-skid systems and their associated valves and hydraulic lines.

In hydraulically operated vehicle brake systems, such as on an aircraft or the like, it can happen that one of the pressure lines is broken or a brake becomes defective and leaks. It is thus important that some type of safety arrangement be provided in the event of a failure of part of the brake system, lest the hydraulic fluid supply pressure be diminished and the total brake system, not to mention the other hydraulic devices served by the hydraulic system, becomes inoperable. The prior art suggests various fusing and checkvalve arrangements for preventing the loss of system pressure on the failure of a single part thereof.

My invention contemplates arrangements for overcoming the above-mentioned problems in a reliable and inexpensive manner. In order to overcome the above-mentioned problems regarding the brake return pressure forces needed with systems having high hydraulic return pressure, I contemplate providing a debooster device interposed between the brake valve and the brake, which device includes means for amplifying the effective back pressure from the brake pistons so that the brake return springs need only exert a fraction of the system return pressure to fully release the brakes. According to certain preferred embodiments of my invention, the debooster device also serves as a brake adjuster.

According to an especially preferred embodiment of the invention, the enhancement of the brake return pressure is obtained by the utilization of a debooster device with a single piston with three different pressure surface areas communicating respectively with the brake valve pressure, the brake pressure, and the return system pressure. These pressure surface areas are so dimensioned that the affect of the return system pressure is negated and the return springs at the brakes need only apply enough pressure to release the brakes against the minimal brake valve pressure. In this preferred embodiment there is also provided a fusing system for limiting the flow of hydraulic fluid from the system in the event of a leak in the system downstream of the debooster device in the direction of the brake.

According to another aspect of the invention, the fusing device for this embodiment is designed in a simple and reliable manner, with a spring loaded moveable fuse piston valve controlling the opening through the pistons exhibiting the three pressure surfaces. In especially preferred embodiments, the fuse piston valve carries a cup washer which encloses a body of hydraulic fluid so as to have a dampening effect. The cup washer is engageable with limit stops in the chamber of the debooster device so that when the piston nears its travel limit the valve is opened to allow the momentary flow of fluid required to pressurize the brake, but such that the valve will close if high pressure differential across the piston persists, indicating that system failure has occurred.

This preferred embodiment with the three pressure surfaces can be used in braking systems having a plurality of separate brakes downstream of and communicating with a single debooster. This embodiment requires a return pressure connection and such is available where anti-skid valves are located. In an arrangement with a single-debooster for a purality of brakes, the debooster would not serve as a brake adjuster. However, this debooster can also be used as an adjuster in arrangements where there is a single debooster adjuster per brake.

According to another preferred embodiment of the invention, a debooster device is provided which includes a first piston having a first small area surface in communication with the brake valve pressure and a second much larger piston face in communication with the brake pressure. With this construction, during release of the brakes when the inlet pressure is reduced to the system return pressure, the much larger surface area in communication with the brake return pressure as compared to the first pressure surface communicating with the system return pressure means that only a fraction of the system return pressure force need be exerted in the pressure system by the brake return springs. For example, when the ratio of the two surfaces on this first piston are 1:5, then 40 pounds per square inch pressure at the brake would be sufficient to balance 200 pounds per square inch of system return line pressure.

With this second debooster embodiment, in order to avoid the necessity of applying exceptionally large brake fluid pressures to actuate the brakes, due to the ratio of the piston surfaces on this first piston, I propose the inclusion of a second piston having a large pressure surface area and a small pressure area disposed respectively oppositely of the pressure surfaces on the first piston. The pressure areas of the two pistons are selectively communicated with one another by means of a moveable control valve which control valve is responsive to the input pressure. With this arrangement, the inlet pressure from the brake valve can be applied fully to the brake during normal braking operations by means of communicating facing surfaces of the two pistons so that they move together. It is only during the transition phases when the pressure is being built-up to apply the brakes and when the pressure is being released to release the brakes, that the differential areas of the control pistons operate to enhance the operation and release of the braking system.

This second debooster embodiment is preferably used in systems having a separate debooster mounted at each respective brake.

These and further objects, features, and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a schematic diagram showing an aircraft braking system with a debooster arrangement constructed in accordance with the present invention, wherein a single debooster serves a plurality of wheel brakes.

FIG. 2 is a partial schematic diagram showing another aircraft braking system with a debooster arrangement constructed in accordance with the present invention, wherein each wheel brake is provided with a debooster.

FIG. 3 is a sectional schematic view showing the operational parts of a first embodiment of a debooster constructed in accordance with the present invention.

DETAILED DESCRIPTION OF THE DRAWINGS

Figure 4:
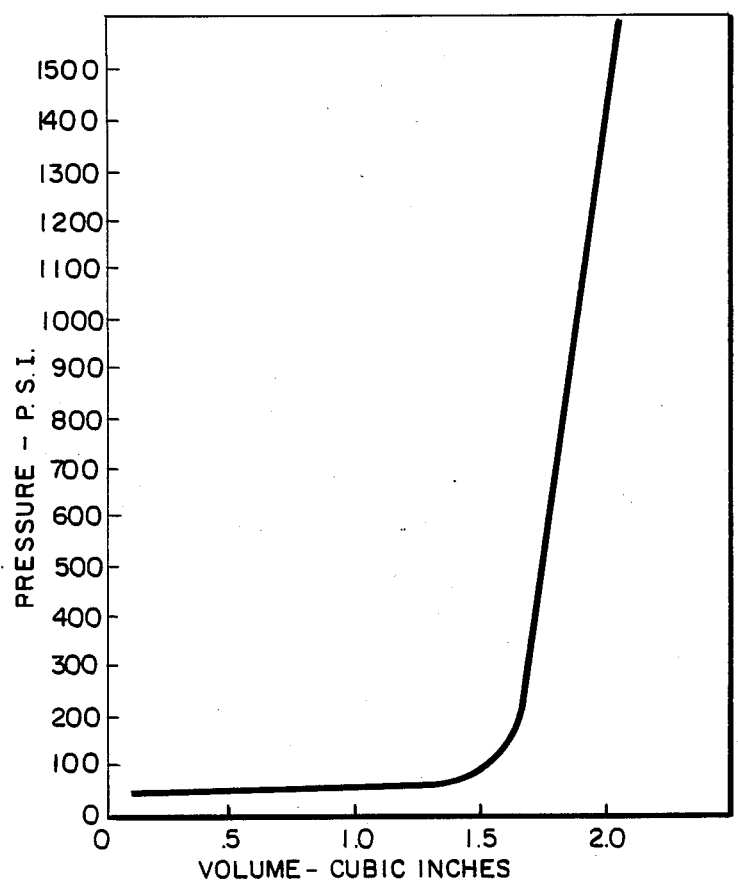
FIG. 4 is a graphical depiction of the typical brake pressure-volume characteristics in a brake system of the type contemplated be the present invention.

FIG. 1 schematically depicts an aircraft wheel brake system of the type contemplated by the present invention. This system includes a hydraulic fluid supply reservoir 1, a pump 2 for pressurizing the hydraulic fluid and a brake valve 3 which is controllable by the vehicle operator to actuate and deactuate the supply of pressurized braking fluid to the aircraft wheel brakes 4. The system also includes anti-skid valves 5 as well as a debooster device 6 constructed in accordance with the present invention and described in more detail below. The hydraulic system circuit also includes a return pressure system with return lines 8 leading from the anti-skid valves 5 to anti-skid common return line 8A, and return line 9 leading from the debooster device 6 to line 8A. The hydraulic system circuit further includes other hydraulically pressure operated devices 10 schematically depicted as also connected into the return pressure system by return line 11.

In the drawings and this description, only those features of the overall brake system as necessary to an understanding of the invention are shown and described. Since the details of such items as the other hydraulically operated devices 10 (which may be hydraulic controls for controllable air foil surfaces and the like) are not a part of the invention, they are not included herein so as not to obscure the invention.

It should be understood that the system of FIG. 1 with which the present invention is contemplated to be used, is of a type where the experienced return pressure can be relatively high, on the order of 100 pounds per square inch (PSI) or more. The brakes 4 can be of conventional disk brake construction, with hydraulic fluid actuated pistons controlling moveable braking parts and with a return spring or springs acting against the hydraulic pressure to return the braking parts to a clearance position when the pressure is reduced. In this arrangement the debooster can serve more than one brake, but cannot be used as an adjuster.

The system depicted in FIG. 2 differs from the FIG. 1 arrangement in that the anti-skid valve 5' is arranged in series with and intermediate the brake valve 3 and debooster 6. The configuration of FIG. 2 is for use as an adjuster debooster where the anti-skid valve is upstream of the adjuster so that anti-skid operation will not affect running clearance, and where there must be one unit per brake.

FIG. 3 shows a first preferred embodiment of a debooster device 6 constructed in accordance with the present invention. The FIG. 3 debooster device 6 includes a housing 12 defining a multi-step cylinder accommodating a moveable piston 13. Housing 12 has a brake valve inlet port 14 which is subjected to brake valve pressure $P_1$. A brake outlet port 15 is provided at the other end, which is pressurized at brake pressure $P_3$ and serves for applying braking fluid to a brake or brakes, such as brakes 4 of the FIG. 1 system. The housing 12 also defines a return pressure port 16 which is at return pressure $P_2$. Piston 13 includes a first endface 13A acted upon by the pressure $P_1$ from the brake valve inlet port 14, a second pressure face 13B acted upon by the return pressure $P_2$, and a third pressure face 13C acted upon by the brake pressure $P_3$.

An inlet valve 17 is provided for controlling the flow of fluid from pressure space $P_1$ to pressure space $P_3$ through the piston 13. This valve 17 includes an inlet valve piston 17A, a cup washer 17B, a washer 17C, and a spring 17D biasing the washers with respect to one another and a return spring 17E biasing the valve 17 to its closed position. A stop 18 is provided at the housing which is engageable with the cup washer 17B to effect opening of the valve 17 upon a predetermined rightward movement of the piston 13.

The operation of the FIG. 3 arrangement is as follows. When pressure is applied at the brake valve port 14, the piston 13 moves to the right, displacing fluid into the brake via the brake port 15 and gradually raising the brake pressure. When piston 13 has approached its limit of rightward travel, contact member or stop 18 unseats the inlet valve 17, allowing additional fluid to enter the brake from the left side of the piston 13. Because of the area difference on the ends 13A and 13C of the piston 13 and a high inlet pressure $P_1$, the piston 13 is held firmly against the housing bottom at the piston skirt and fluid is free to flow in and out of the brake to maintain the pressure applied by the brake valve 3 (FIG. 1).

When pressure $P_1$ is released at brake valve port 14, there is a point at which forces acting on the piston 13 are balanced and as pressure $P_1$ is reduced further, the piston 13 starts moving to the left causing inlet valve 17 to close. At this point, the additional volume of fluid released from the brake is proportional to the piston travel. In a preferred arrangement, the area of surface 13A is equal to the area of surface 13B minus the area of surface 13C so that the affect of system return pressure $P_2$ is effectively nullified, and the brake return springs will assure running clearance of the brake.

In preferred embodiments, for use with a brake having a brake pressure-volume displacement characteristic as depicted in FIG. 4, the piston surfaces of piston 13 would be arranged approximately as follows: the surface area of surface 13A would be 2 square inches; the surface area of surface 13B would be 3 square inches; and the surface area of surface 13C would be 1 square inch. If the debooster device 6 was also to be used as an adjuster (for example in the system depicted in FIG. 2 with a separate debooster for each brake 4), the piston travel of piston 13 would be about 1.7 inches. If debooster 6 was not to be used as an adjuster (in a system where brake clearance is established in the brake, for example, in the system of FIG. 1 with multiple brakes for one debooster) piston travel would be greater enough to allow for fluid expansion and for the number of brakes per debooster.

Figure 5:
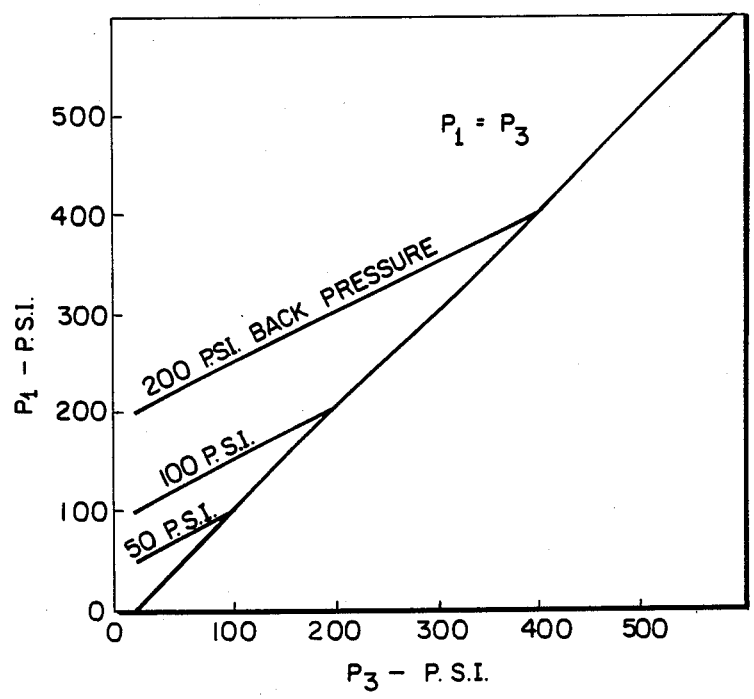
FIG. 5 is a graphical representation of the pressures experienced during operation of a braking system with the debooster device of FIG. 3.

FIG. 5 schematically depicts the relationship between the pressures during operation of the FIG. 3 debooster device 6. The balance of forces acting on the piston 13 can be expressed as $P_1A_1=P_2(A_2-A_3)+P_3A_3$, wherein:

$P_1 = P_1$
$A_1 =$ the area of surface 13A
$P_2 = P_2$
$A_2 - A_3 =$ the area of surface 13B
$P_3 = P_3$
$A_3 =$ the area of surface 13C If we now take the condition during brake release when the piston is balanced and $P_1$ is equal to $P_3$, the formula becomes $$P_1A_1 = P_2(A_2-A_3) + P_1A_3 \text{ or}$$
$$P_1(A_1-A_3) = P_2(A_2-A_3)$$

By using values assumed above for $A_1$, $A_2$ & $A_3$, we find that $$P_1 = 2P_2$$

Now the starting and ending points for $P_2$ vs. $P_3$ pressure for various back pressures are known and are shown in FIG. 5. Note, for example, that from 50 to 200 PSI back pressure the point at which $P_1=P_3$ varies from 100 to 400 PSI.

For most effective braking, each brake should be independent of the others and not affected by anti-skid operation, loss of fluid, etc. However, for practical considerations of complexity, weight, and cost, some sacrifices to maximum braking capability may be made. Since anti-skid operation is frequent for modern aircraft brake systems, there should always be one anti-skid valve for each brake, but there will not necessarily be one fuse for each brake, since line breakage is not frequent in such arrangements. There must be one debooster per brake if it is to be used as an adjuster, and it must be mounted downstream from the anti-skid valve. The location of the debooster in the system and whether or not to include a fuse depends on the parameters set forth above.

If the volume of fluid trapped in the brake expands, or brake clearance is reduced for any other reason, normal clearance will be established simply by application and release of the brake. If $P_3$ pressure increases at once when the piston 13 starts to move to the right (due to excessive fluid volume in the brake), the area difference on the ends of the piston 13 will cause $P_3$ to become greater than $P_1$. The inlet valve 17 then acts as a relief valve, allowing fluid to flow out of the brake until maximum travel is reached and the inlet valve 17 is opened by the stop. When the brake is then released, normal clearance will be obtained.

The debooster shown in FIG. 3 is particularly advantageous when used with anti-skid valves of multiple wheel brake systems, because it is simple in construction with resultant reliable and rapid response facilitating reliable and rapid release of pressure at the brakes.

Other preferred embodiments are contemplated which have a debooster device similar to device 6 of FIG. 3, but with the addition of a light return spring intermediate the piston 13 and the right hand inside wall of the housing 12. Such a return spring can readily fit in the space provided and will add minimum weight to the system while further decreasing required spring forces in the brake.

The debooster device 6 is to be mounted at a point where connection to hydraulic system return pressure is available and a preferred position is at the same location as the anti-skid valve or valves 5, 5' depicted in FIGS. 1 and 2. There are piping or line connections from device 6 to the brake or brake 4 which are vulnerable to failure and therefore loss of hydraulic fluid. For this reason, certain preferred embodiments of the present invention incorporate a fusing arrangement to limit loss of hydraulic fluid in the event of hydraulic system failure downstream of the brake port 15.

Figure 6:
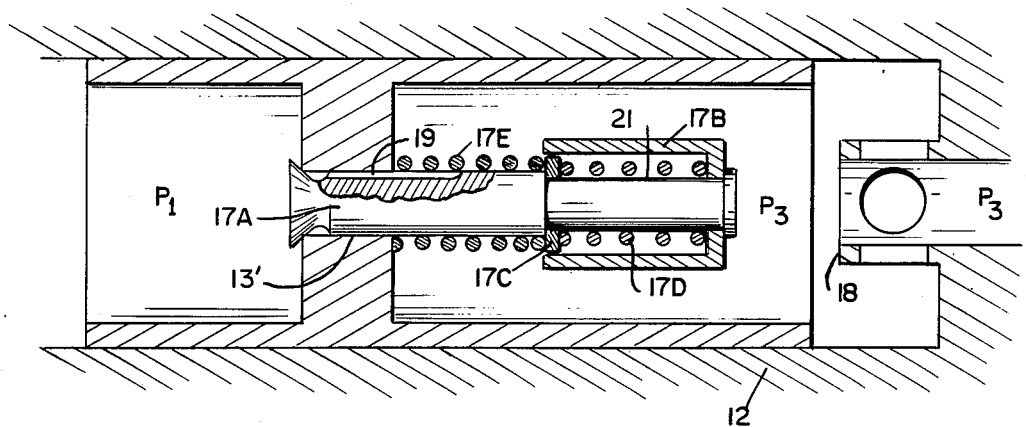
FIG. 6 is an enlarged schematic view of a fusing mechanism for a brake system constructed in accordance with preferred embodiments of the present invention.

Reference is made to FIG. 6 which shows in enlarged schematic form a portion of the FIG. 3 debooster. The inlet valve piston 17A is closely fitted to the piston bore 13' of the piston 13. A groove or flat 19 is formed on the inlet valve piston 17A to allow restricted fluid flow when it is unseated by being moved to the left with respect to piston 13. The inlet valve piston 17A is normally held in a closed position by springs 17D and 17E acting respectively on cup 17B and washer 17C. When movement of piston 13 causes contact between cup washer 17B and stop 18, spring 17D (which is stronger than spring 17E) forces the inlet valve piston 17A to the left with respect to piston 13, thereby communicating the flat 19 to the two pressure spaces $P_1$ and $P_3$. Fluid can then flow past the inlet valve piston 17A from $P_1$ to $P_3$ at a rate depending on the area of the groove 19 in the inlet valve piston 17 and the pressure differential. These variables should be such that a more than sufficient volume of fluid can flow past the inlet valve piston 17A to pressurize the brake. However, if failure in the system downstream of the inlet valve 17 causes a sudden loss of pressure, the pressure differential acting on the end faces of the inlet valve piston 17A aided by the force of spring, 17E overcomes the biasing force of spring 17D, and spring 17D thereby compresses such that a portion of valve piston 17A haivng spring 17E thereabout slides under cup washer 17B as a portion of valve piston 17A enters brake port 15, which thereby, causes the valve 17 to close and shut-off fluid flow. In the instances where $P_1$ pressure is insufficient to close the valve 17, the restriction at the flat 19 will serve to reduce leakage to a very low rate which should prevent any significant loss of fluid.

The purpose of the cup washer 17B is to form a chamber 20 in which hydraulic fluid is confined by a close fit with the washer 17C and the valve stem 21 on the inlet valve piston 17A. If the piston 13 (and therewith the piston 17A) is moving rapidly when contact is made by the cup washer 17B with the stop 18, dynamic conditions might allow the valve 17 to remain closed as pressure differential from $P_1$ to $P_3$ builds-up so that full brake pressure cannot be achieved. The fluid trapped in chamber 20 acts as a dash pot so that spring 17D cannot be rapidly compressed. In this manner, the inlet control valve piston 17A is momentarily forced to open and allow fluid to flow from $P_1$ to $P_3$ to pressurize the brake.

Figure 7:
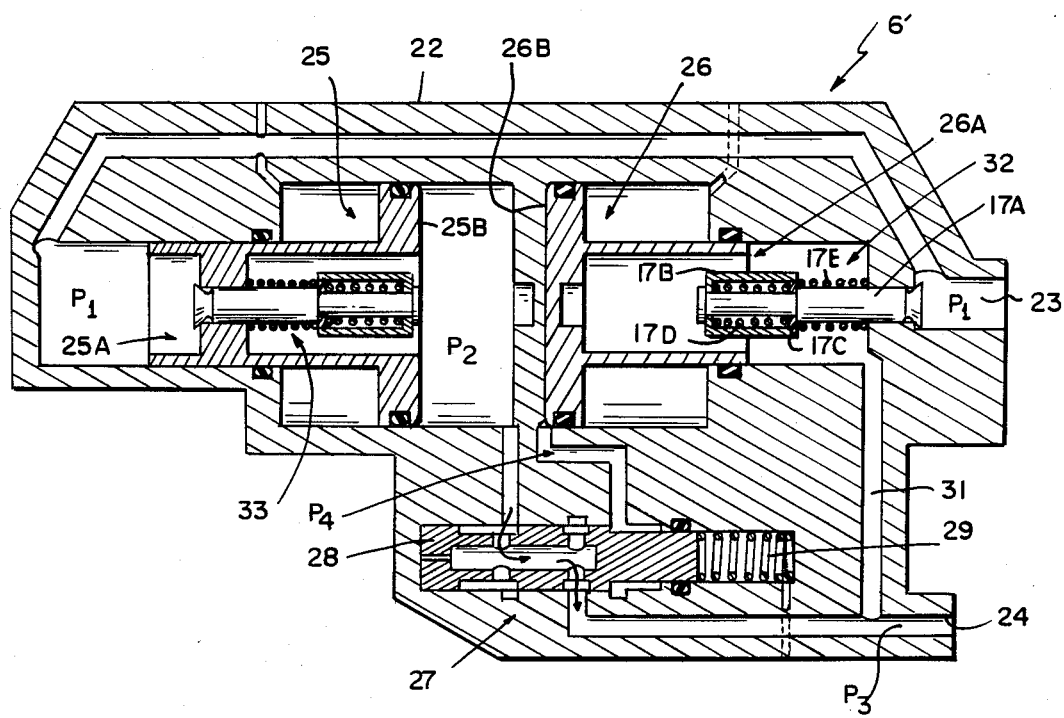
FIG. 7 is a sectional schematic view depicting a further embodiment of a debooster constructed in accordance with the present invention.
Figure 8:
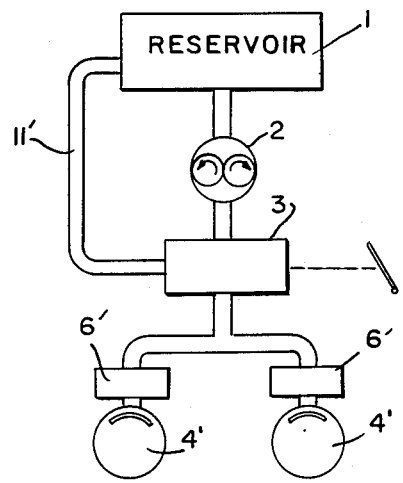
FIG. 8 is a schematic diagram showing a braking system utilizing the deboosters of the type depicted in FIG. 7.

Referring to FIG. 7, there is shown another preferred embodiment of debooster 6' in schematic sectional view. This debooster 6' is designed for mounting at an individual brake 4' in a system such as schematically depicted in FIG. 8 including return line 11'. Debooster 6' includes a housing 22 which has a brake valve port 23 communicated directly with the brake valve 3, and a brake port 24 communicated directly to the line leading to the brake 4' (see FIG. 8 showing the debooster attached directly at the brake housing of brake 4'). $P_1$ indicates the pressure of the hydraulic fluid introduced into the brake valve port 23, and $P_3$ indicates the pressure at the brake port 24.

The debooster device 6' includes three main components, namely, a primary double diameter piston 25, a secondary double diameter piston 26, and a control valve 27. The components are arranged so that fluid under pressure $P_1$ from the brake valve 3 is applied to the small end 25A of the primary piston 25, which primary piston pressurizes the fluid at lower pressure $P_2$ at its large end 25B. At low pressure $P_1$, the control valve piston 28 of the control valve 27 is spring biased by spring 29 to its illustrated leftward position. In this leftward position, the control valve 27 communicates the pressure $P_2$ directly with the brake port pressure $P_3$.

At higher pressures $P_1$, the control valve piston 28 is forced to the right against spring 29, first closing off the communication between $P_2$ and $P_3$, and then providing communication from $P_2$ to $P_4$. $P_4$ is communicated to the left face 26B of the secondary piston 26. Further increase of $P_1$, $P_2$, and $P_4$ pressures cause the secondary piston 26 to move to the right and additional fluid is then forced from the small end surface 26A of the secondary piston 26 into the brake via channel 31, producing brake pressure $P_3$ equal to brake valve channel $P_1$. When the secondary piston 26 has approached the limit of its travel, inlet valve 32 opens to allow free flow of fluid from the valve port 23 to the brake port 24. At this point, since inlet pressure $P_1$ and brake pressure $P_3$ are essentially the same, fluid can flow freely into and out of the brake in order to satisfy the pressure called for by the brake valve.

At intermediate pressures when the control valve piston 28 is at its far right position and $P_2$ and $P_4$ pressures are the same, the two pistons 25 and 26 move together as a hydraulic link. If their two diameters are the same, or nearly the same, a movement of either of these pistons 25 and 26 to the left or the right is accompanied by a corresponding movement of the other one. Under these conditions, the pressure $P_3$, which is the brake pressure, becomes the same as the pressure $P_1$, which is the brake valve pressure, and the device shown in FIG. 7 has little effect on brake operation.

When pressure at the brake valve port 23 is reduced, a corresponding reduction of $P_2$ and $P_4$ takes place. At a certain pressure the control valve piston 28 will move to the left due to the spring 29, severing communication between $P_2$ and $P_4$, and then allowing fluid to flow out of the brake from $P_3$ to $P_2$ to satisfy the reduced pressure demand. Primary piston 25 is free to move to the left to accept the fluid volume released from the brake, and always maintains a position such that the ratio of $P_1$ to $P_2$ is the ratio of the areas of the ends 25A and 25B of the piston 25. With this arrangement, light brake return springs can produce brake running clearance against relatively high hydraulic system return pressure.

It is furthermore preferred that the debooster device 6' includes means to assure that fluid needed to operate the brake is always available. As so far described, operation of the device 6' would be normal upon initial filling of the $P_2$ chamber with fluid equivalent to brake clearance volume. However, to assist in initial filling after installation on the vehicle, and to assure that fluid will be available to actuate the secondary piston 26 under any conditions, poppet valve 33 is provided. This valve 33 is unseated slightly when the primary piston 25 bottoms to the right, so that fluid can flow freely past the piston 25. The operation of this poppet valve 33 as a fuse is similar to that described above in conjunction with the illustration of FIG. 6. For the debooster device 6' to protect against excessive loss of hydraulic fluid, the inlet valve 32 may also be designed similarly to operate as a fuse.

Figure 9:
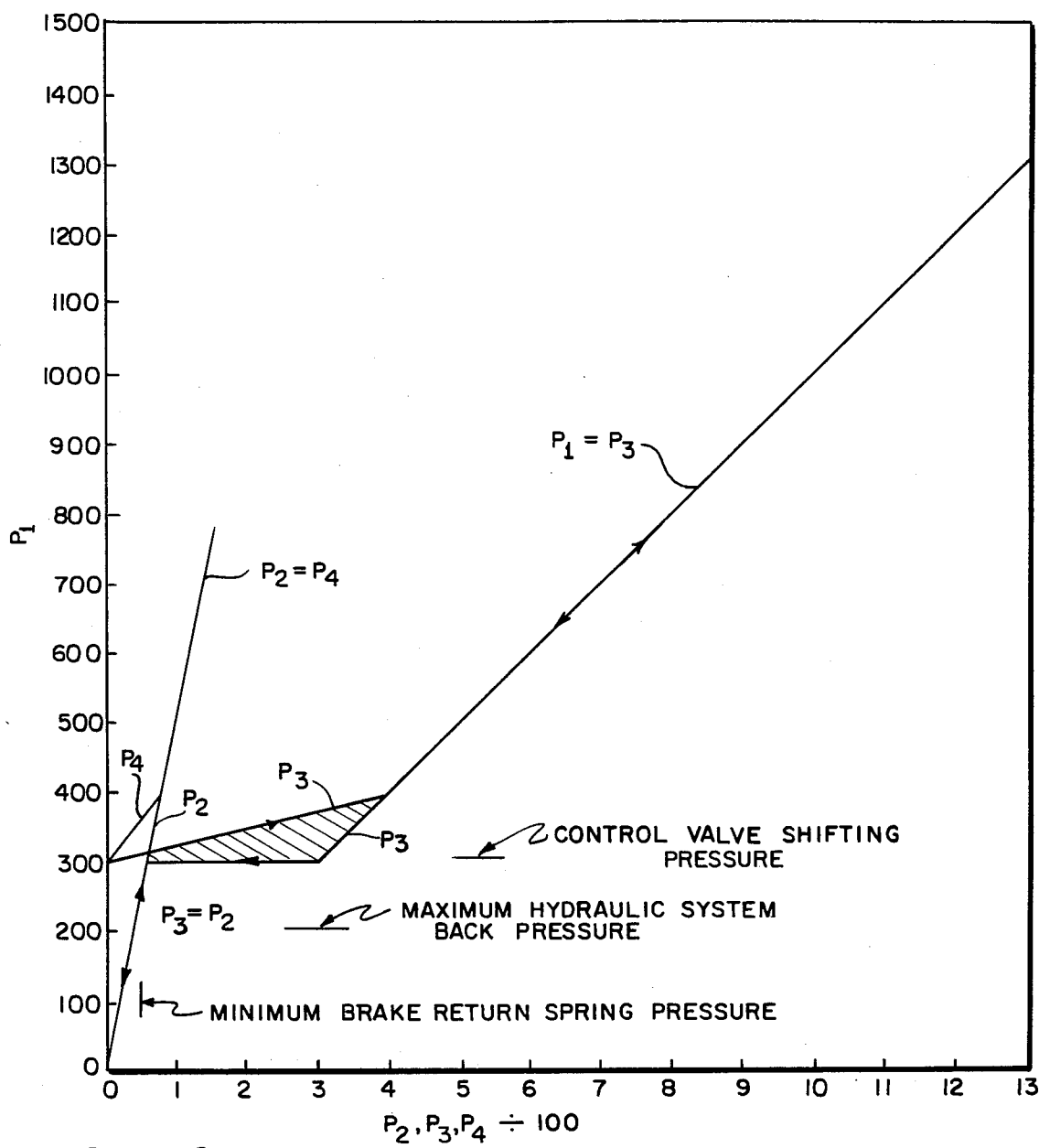
FIG. 9 is a graph depicting the indicated relative pressures experienced at various points in the debooster of FIG. 7 during operation of a braking system incorporating same.

FIG. 9 schematically depicts the relationship between various pressures in the device 6' as the brake is applied and released, as indicated by directional arrows. System operation can be best understood by comparing this FIG. 9 graphical depiction with the FIG. 4 brake displacement curve.

Consider that the device 6' has been installed with a brake 4' (FIG. 8) in an hydraulic system, pressure applied, the system purged of air, and pressure released. The brake 4' is at its normal running clearance, the primary piston 25 is at an intermediate position, and system return pressure is 200 PSI or less. $P_2$ and $P_3$ pressure is one fifth of the system ($P_1$) pressure, and therefore 40 PSI or less. Now, when a brake application at $P_1$ is initiated, $P_2$ pressure increases to 60 PSI before shifting of control valve 27 commences, and 1.3 cubic inches of fluid has been forced into the brake 4'. As $P_4$ pressure rises due to flow from $P_2$ through the control valve 27, the force applied to the secondary piston 26 increases so that when $P_2$ is slightly more than 60 PSI (with $P_1$ being slightly more than 300 PSI), the secondary piston 26 starts pressurizing $P_3$ along a sloping line due to the unbalance of the control valve 27. When $P_1$ pressure reaches 400 PSI, $P_4$ has become equal to $P_2$, and $P_3$ has become equal to $P_1$. Further increases of $P_1$ now causes further movement of secondary piston 26 to maintain $P_3$ equal to $P_1$. If the secondary piston 26 reaches the limit of its travel because additional volume is required to operate the brake, the inlet valve 32 will open to allow additional fluid to flow into the brake via inlet port 23, valve 32, and channel 31.

When brake valve pressure $P_1$ is released gradually, the corresponding reduction of $P_2$ and $P_4$ allows $P_3$ to force the secondary piston 26 to the left so that fluid released from the brake causes brake pressure to be maintained essentially equal to brake valve pressure. If fluid has entered the brake through the inlet check valve 32 during the brake application, the secondary piston 26 may reach its extreme left position at a higher pressure than that at which it initiated movement to the right upon brake application. In this event, valve 32 (held closed by light spring 17F) will open and allow fluid to flow from $P_3$ to $P_1$ and allow brake pressure to decrease.

At control valve shifting pressure ($P_1 = 300$ PSI, $P_2 = 60$ PSI), the control valve piston 28 will move to the left and allow fluid to flow from $P_3$ to $P_2$. The volume of fluid which must be released from the brake to reduce pressure from 300 PSI to 60 PSI is about 0.4 cubic inches, as shown by FIGS. 4 and 9. Further reduction of $P_1$ pressure now allows the brake return springs to force fluid from the brake (against $P_1$ back pressure) until brake running clearance is achieved.

Note that the control valve shifting pressure has been shown to be the same at increasing and decreasing pressure. The unbalanced control valve 27 would theoretically cause shifting pressure to be greater at decreasing pressure because then $P_4$ equals $P_2$ at the shifting point rather than $P_4 < P_2$ as when pressure is increasing. However, valve seal friction will at least to some extent offset this effect.

The affect of the control valve shifting at too high a pressure, either during increasing or decreasing pressure, is to cause too great a portion of the braking range over which a slight change in braking demand causes a large change in braking effect (shaded area of FIG. 9). In the example shown, the maximum brake pressure is 3000 PSI, so that control valve shifting at 300 PSI represents 10% of maximum pressure.

The affect of the control valve 27 shifting at too low a pressure on increasing pressure is, as described previously, the possibility of insufficient displacement of the secondary piston 26 to get pressure high enough before opening of inlet valve 32. On decreasing pressure, the control valve 27 must shift by the time inlet pressure has reached its minimum value in order that brake running clearance will be achieved.

In embodiments where the brake does not have "pull through" type mechanical adjusters which maintain essentially constant spring length (and force) as brake lining wears, then spring force may vary over a considerable range. For such a range, the device 6' should be dimensioned to cover the wider pressure range and valve shifting should occur at a high enough pressure so that control valve shifting will not occur too soon. For example, the brake pressure at shifting would then be on the order of 500 PSI.

The foregoing is a general description of the method of operation of the device in FIG. 7. For a practical application to a specific brake system, a more complete description of the features of a preferred embodiment will now be given. The device should satisfy the desired objective of reducing the affect of back pressure on brake design and also result in safe, satisfactory brake operation. Operational features of this device are best explained by comparison with the typical pressure-volume characteristic graph of FIG. 4. FIG. 4 shows the relationship between the pressure applied and the volume absorbed by a vehicle brake.

Referring to FIG. 4, assume that the brake is for use in a system having 200 PSI maximum back pressure in the return system, when the brake valve pressure is in a non-braking condition. A debooster or device such as the FIG. 7 embodiment having pistons 25 and 26 with 5:1 area ratios for the pressure surfaces is to be used with the brake. In this system, brake return springs would therefore be used with sufficient force to develop 40 PSI minimum when fully extended.

The approximate pressure at which brake clearance is taken-up when pressure is applied is indicated by the point at which the pressure versus volume curve of FIG. 4 departs from a straight line, indicating that contact is being made between rotating and non-rotating parts of the brake. This point in FIG. 4 is at about 60 pounds per square inch, and this becomes the point at which the control valve piston 28 should be designed to move. The volume displaced at this point is 1.3 cubic inches, which is then the minimum amount which must be displaced by the primary piston 25. Since brake running clearance is to be established by the brake, the debooster 6' should allow for fluid expansion by having approximately 50% more volume, or about 2.0 cubic inches. If a piston diameter of 2 inches is selected, the area is 3.1416 square inches and piston travel required for 2 cubic inch displacement is about 0.64 inches. The small end of the piston is to be one fifth the area of the large end, or 628 square inches which is 894 inches diameter.

Selection of minimum displacement by the secondary piston 26 is governed by: (i) the expected variation in the point on the brake displacement curve (FIG. 4) at which the control valve piston 28 will shift from communicating $P_2$ to $P_3$ to communicating $P_2$ to $P_4$; and (ii) the volume required to get from the shifting pressure to, for example, 300 PSI (pounds per square inch). Displacement of the secondary piston 26 must be great enough to ensure that a pressure of at least 300 PSI will be obtained before the inlet valve 32 is opened. The reason for this is that on successive brake applications not accompanied by brake lining wear (or other factors affecting brake volume), the amount of fluid put into the brake by the primary piston 25 plus the amount put in by valve 32 cannot be greater than the amount released. If premature opening of the inlet valve 32 occurs, some fluid will be admitted to the brake at low pressure which would then have to be absorbed by the primary piston 25 on release of the brake. Each brake application and release would then result in further and further movement of the primary piston 25 to the left, until its ability to permit full brake release for normal running clearance is impaired. If a high pressure control valve shifting point is used to overcome this, the inlet pressure from the brake valve at the shifting point will be high, so that there will be a large, abrupt increase in brake pressure when shifting occurs, making smooth vehicle braking difficult. Accordingly, a displacement of 0.6 cubic inches from the secondary piston 26 is selected in a particularly preferred practical embodiment. This amount allows the valve piston 28 to shift at as low as 1.1 cubic inches on the brake displacement curve and still reach (300 PSI—$P_3$; 60 PSI—$P_4$) before additional volume must come from the inlet valve 32.

The 0.6 cubic inch displacement is from the small end surface 26A which could be the same diameter (0.894 inches) and area (0.628 square inches) as the primary piston surface 25A. Required piston travel would then be: $0.628 \div 0.6 = 1.046$ inches. It would then be necessary to go back to the primary piston 25A to allow additional travel, because travel of the secondary piston 26 is produced by motion of the primary piston 25 after brake clearance is taken-up (after the control valve piston 28 has shifted). 1.046 inches travel of the secondary piston 26 times the large end (26B) area is 1.046×3.1416, or 3.284 cubic inches. This amount added to the 2 cubic inches needed for brake clearance becomes 5.284, and total primary piston 25 travel is then 1.682 inches.

In determining practical dimensions for the control valve 27, 28, a first consideration is the affect of dynamic conditions on the brake system. As explained above, it is important for proper functioning that the control valve 27 shifts at the proper point upon brake application. The shape of the brake displacement curve (FIG. 4) shows that the control valve shifting point can occur at a rather wide range of volumes if the brake pressure at shifting varies, as it is likely to do under varying conditions of brake pressure application rate. To allow for this the control valve 27 is arranged so that a rather large valve travel is needed to initiate porting changes. An orifice limiting flow rate to the end of the valve then can produce a slight time delay in valve operation. "Tuning" of the system by adjustment of the orifice size and valve spring force can thus be accomplished to bring about desired valve operation. Up to this point in this description, valve operation has been described primarily with increasing pressure. Operation for decreasing pressures is essentially the same, except that the shifting point is not as important because braking is affected only by the minimum controllable brake pressure that will be obtained. Variation of shifting pressure also slightly affects the volume released and therefore the position of the primary piston 25 after full release of brake pressure.

When shifting of valve 27 occurs on increasing pressure, the transfer of the connection of $P_2$ from $P_3$ to $P_4$ occurs quickly, since little control valve travel is involved at that point. Brake pressure will therefore increase from one fifth of $P_1$ to full value of $P_1$ as rapidly as fluid can flow through the valve 27 and actuate the secondary piston 26. It may therefore be desirable to slightly unbalance the valve according to preferred contemplated embodiments so that $P_4$ does not immediately equal $P_2$, but increases gradually with an increase of $P_2$ until at a higher pressure the valve 27 is forced to its extreme right hand position and $P_1$ equals $P_4$, and consequently $P_2$ equals $P_3$ for direct brake operation.

While I have shown and described several embodiments in accordance with the present invention, it is understood that the same is not limited thereto but is susceptible to numerous changes and modifications as would be known to those skilled in the art of the present disclosure and I therefore do not wish to be limited to the details shown and described therein, but intend to cover all such changes and modifications as are encompassed by the scope of the appended claims.

I claim:

1. Hydraulic brake pressure applying and releasing arrangement for a vehicle braking system subject to high system return pressure, comprising:
   a brake valve inlet port for communicating hydraulic fluid under pressure to and from a brake valve,
   a brake operating outlet port for conmunicating hydraulic fluid under pressure to and from, in pressure applying and pressure releasing stages, respectively, a brake of the type having brake return spring means,
   and hydraulic fluid control means intermediate the inlet port and the outlet port, said control means including means for amplifying the hydraulic pressure effect in the direction from the outlet port to the return pressure system, by continuously and automatically applying the pressure force of said return pressure with the pressure force of the hydraulic fluid from said brake in the pressure releasing stage, such that the brake return pressure exerted at the outlet port by the brake return springs can be substantially less than the system return pressure.

2. An arrangement according to claim 1, comprising a control housing means, wherein said inlet port, said outlet port, and said fluid control means are disposed in said housing means.

3. An arrangement according to claim 2, wherein said fluid control means includes fuse means for automatically limiting further hydraulic fluid flow through the outlet port in response to loss of pressure downstream of the outlet port.

4. An arrangement according to claim 2, wherein said fluid control means includes:
   a first moveable piston having a first pressure surface communicating with the inlet port and a second oppositely disposed pressure surface communicating with a first chamber filled with hydraulic fluid, said first pressure surface being substantially smaller than the second pressure surface,
   a second moveable piston having a first pressure surface communicating with a second chamber filled with hydraulic fluid and a first oppositely disposed pressure surface communicating with the outlet port, said first pressure surface being substantially larger than the second pressure surface, and
   control valve means for selectively controlling the communication of hydraulic fluid in the first chamber either directly with the outlet port or with the second chamber.

5. An arrangement according to claim 4, wherein the control valve means includes a spring biased piston valve member which has the pressure of the first chamber acting against the spring, wherein the control valve means communicates the first chamber directly with the outlet port for predetermined low first chamber pressures and communicates the first chamber with the second chamber for higher first chamber pressures.

6. An arrangement according to claim 4, wherein said second piston is spring biased in a direction against the fluid pressure in the second chamber in order to return the second piston to its start position upon the lowering of outlet pressure.

7. An arrangement according to claim 4, further comprising fuse means in said control valve means for automatically limiting further hydraulic fluid flow through the outlet port in response to loss of pressure downstream of the outlet port.

8. An arrangement according to claim 7, wherein said fuse means includes a fuse piston valve carried in the first piston, said fuse piston valve controlling an opening through the first piston from the inlet port side to the first chamber, said first fuse piston valve being spring biased to a normal closed position and being opened upon a predetermined movement of the first piston.

9. An arrangement according to claim 7, wherein said fuse means includes a second fuse piston valve carried in the second piston, said fuse piston valve controlling an opening through the second piston from the inlet port to the outlet port.

10. An arrangement according to claim 2, wherein said fluid control means includes a control piston moveably mounted in said housing, said control piston having a first pressure surface communicating directly with said inlet port, a second pressure surface communicating directly with said outlet port, and a third pressure surface communicating with system return pressure, said first pressure surface facing oppositely of said second and third pressure surfaces.

11. An arrangement according to claim 10, configured as an adjuster as well as a debooster with separate such fluid control means for each vehicle brake.

12. An arrangement according to claim 10, wherein said fluid control means includes fuse means for automatically limiting further hydraulic fluid flow through the outlet port in response to loss of pressure downstream of the outlet port.

13. An arrangement according to claim 12, wherein said fuse means includes a fuse piston valve carried in the control piston, said fuse piston valve controlling an opening through the control piston from the inlet port side to the outlet port side, said fuse piston valve being spring biased to a normal closed position and being opened upon a predetermined movement of the control piston.

14. A hydraulic brake system comprising:
brake valve means for applying fluid pressure;
brake means responsive to fluid pressure levels to actuate said brake means between applied and released positions;
system fluid return means for receiving fluid at return pressures from hydraulic devices, including said brake means; and
control means, connected to said brake valve means, said brake means and said return means such that said control means receives fluid pressure from said brake valve means to actuate said brake means into said applied position and supplies fluid pressure to said return means when said brake means is actuated into said released position, for neutralizing the pressure effect of return pressures opposing the actuation of said brake means into said released position by continuously and automatically applying fluid at said return pressures to provide force in a direction to assist in achieving said released position when said brake means is actuated toward said released position.

15. The hydraulic brake system according to claim 14 wherein said control means includes therein flow-through valve means for permitting fluid under pressure from said brake valve means to be applied directly to said brake means for actuating said brake means into said applied positions.

16. The hydraulic brake system according to claim 15 wherein said flow-through valve means is actuated only after fluid pressure in said brake means attains a predetermined level.

17. The hydraulic brake system according to claim 15 wherein said control means includes piston means having differential surfaces areas exposed to said supply pressures, said return pressures, and fluid pressures applied to said brake means.

18. The hydraulic brake system according to claim 17 wherein said control means functions as a brake debooster by applying said supply pressures on said piston means so as to be opposed by the forces applied to said piston means by said return pressures and said fluid pressures applied to said brake means when said brake means is actuated to said released positions.

19. The hydraulic brake system according to claim 18 wherein said control means also includes fuse means for automatically limiting further fluid flow through said flow-through valve means in response to sustained pressure loss in said brake means blow a predetermined level which causes an excess pressure differential between said brake valve and said brake means.

20. The hydraulic brake system according to claim 14 wherein said control means comprises a valve piston having opposing pressure responsive surfaces for determining valve displacement, and wherein said return pressures are provided to both sides of opposing pressure responsive surfaces when said brake means is actuated toward said released position.

* * * * *